Dec. 5, 1950  C. E. NEWKIRK  2,532,637
HITCH
Filed March 13, 1945
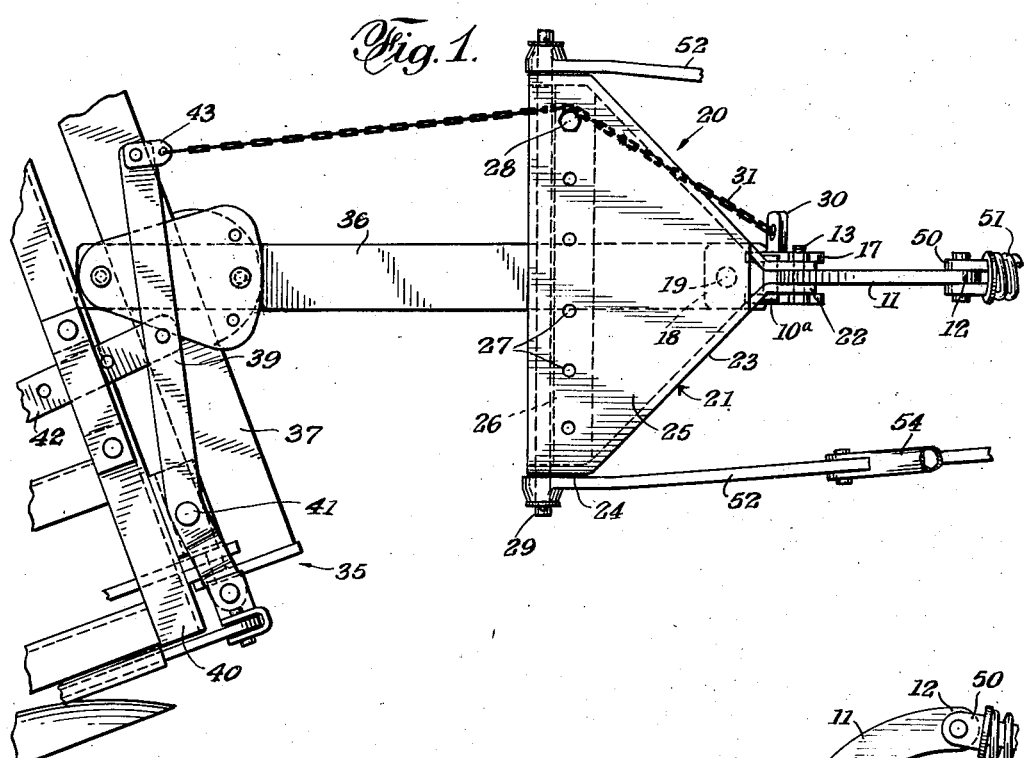
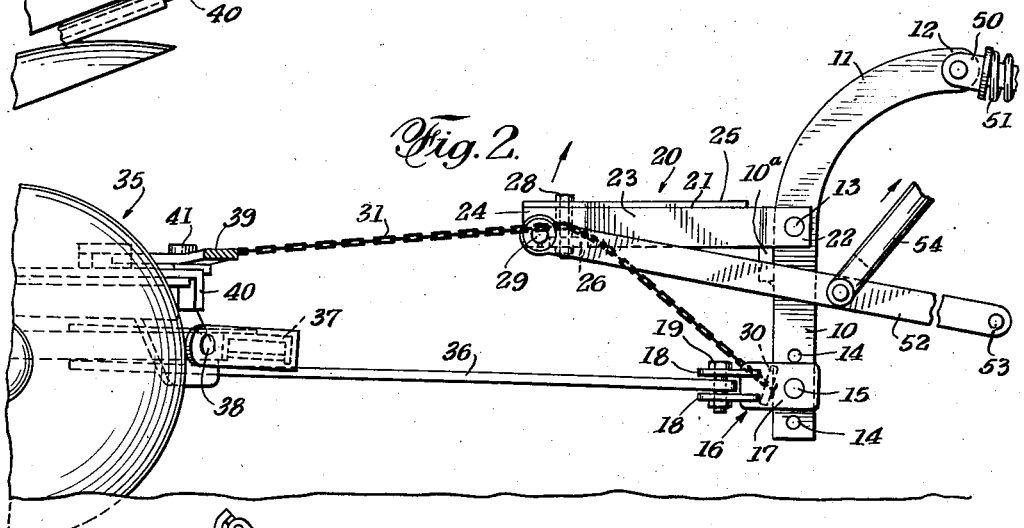
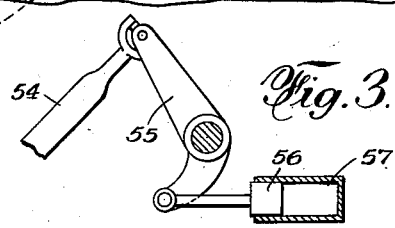
INVENTOR.
CLARENCE E. NEWKIRK
BY
Carlos G. Stratton
ATTORNEY Patented Dec. 5, 1950

2,532,637

UNITED STATES PATENT OFFICE 2,532,637

HITCH

Clarence E. Newkirk, Lynwood, Calif.

Application March 13, 1945, Serial No. 582,532

5 Claims. (Cl. 97—50)

This invention relates to means for hitching an agricultural tool to a towing vehicle such as a tractor, or the like, the present invention dealing particularly with a hitch for a disc harrow, or the like.

The hitch of the present invention is especially adapted for use on tractors employing the Ferguson system for controlling the working depth of agricultural tools. The Ferguson system consists of one top and two lower links, and a hydraulic mechanism. This latter mechanism is made up of a pump, a ram cylinder and lift arms. These assemblies work as a unit and furnish automatic so-called finger-tip control for all implements.

In operation, a control lever is moved to a position which will control the depth at which an implement is to operate. This action opens a control valve, releasing oil in the ram cylinder, which allows the implement to drop until the pressure of the top link on the control spring compresses the spring enough to move the control valve back into a neutral position. This keeps the implement from going any deeper.

This brief résumé of the Ferguson system is here given for a clearer understanding of the hitch herein, and also because the present hitch, while particularly adapted for harrows, may be employed with various other farm tools.

An object of the present invention is to provide a hitch whereby control of the position of the discs of a harrow with relation to the ground may be had from a position on the tractor.

Another object of the invention is to provide a hitch whereby automatic lifting of the harrow discs may be had upon turning said tractor as at the end of a furrow.

Another object of the invention is to provide a hitch affording variable interconnecting arrangement of the parts whereby both controlled and automatic lifting of the harrow discs may be had, or controlled lifting alone.

A further object is to provide a hitch whereby the tractor pull on the harrow is transmitted to the control spring of the tractor by intermediate means affording easier pulling and turning.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a plan view of a hitch embodying the invention and shown as applied to a tractor and connected to draw a harrow.

Fig. 2 is a side view thereof.

Fig. 3 is a fragmentary detail view showing certain portions of the operating means of a tractor.

The hitch of the invention herein disclosed may be said to comprise a bar 10 having a forwardly curved upper portion 11 which may terminate in an eye 12. An intermediate point of the bar 10 may have a pivot 13 and, at its lower end, may have a plurality of holes 14 for selective connection with a horizontal pivot pin 15.

The bar 10, on the horizontal pivot pin 15, may carry means such as a shackle 16 which may have limited movement on the pin 15. Said shackle may comprise a pair of plates 17 arranged on both sides of the bar 10 and connected, as by welding, with a pair of plates 18 slightly overlapped but rearward of the plates 17, transverse thereto, and carrying a vertical pivot pin 19.

The bar 10, on the pivot 13, may carry a tiltable frame 20. Said frame may comprise side bars 21, each oppositely bent to provide opposed ears 22, outwardly directed angular parts 23, and rearwardly directed parallel portions 24. The ears 22 may be connected on the pivot pin 13 as shown. A top plate 25, welded to the bars 21, provides a rigid structure for said frame which may also include a bottom plate 26 spaced from the plate 25, and both said plates may be formed with a plurality of aligned holes 27. In said holes may be selectively placed means such as a stud 28. The frame 20, which is adapted to be tilted on the pivot 13, may carry a rod 29 extending through the lateral walls of the frame, said walls comprising the bar ends 24. A stop bar 10$^a$ may be provided on the bar 10 as a support for the frame 20 in its lowest position.

The shackle 16, on one side plate 17 thereof, may have affixed, as by welding, a plate 30 having means for attaching the end of a chain 31. The chain 31 then extends around the stud 28 within the frame 20 and is connected to an agricultural machine such as shown at 35.

This machine may comprise a disc harrow in which the discs and the tracking or support wheels may be relatively positioned to both adjust the working depth of the discs and to completely raise the discs from the earth. Of such a machine, there are shown the hitch bar 36, which is connected by the bolt 19 to the hitch; the draw-bar 37, which mounts the hitch bar; pivotal means 38 for the draw-bar; a lever 39 pivoted on the harrow frame 40 at 41; and a bar 42 which has connection with mechanism effecting the mentioned relative movement of the harrow discs and the mounting wheels thereof.

The chain 31 is connected to the end of the lever 39, as by a chain clip 43. It is to be understood that a pull on the lever 39, as by the chain 31, will cause lifting of the harrow discs.

The hitch, by means of the eye 12, may be connected to the previously mentioned top link of the Ferguson system. This link is shown at 50, said link being provided with a control spring 51. The rod 29 has connection with the mentioned lower links which are shown at 52, said links being pivotally mounted at 53 on the tractor. Said links 52 each are connected with an operating link 54 connected with a bell crank lever 55, controlled by the piston 56 of a hydraulic cylinder 57. It will be understood that the elements 50 to 57, inclusive, are parts of an old and well known mechanism, and are shown only in their relation to the present invention.

In operation, the tractor with the mentioned three points of connection for the hitch, draws the farm tool 35 through the medium of the hitch bar 36. Since the bar 10 is connected at its upper end on the ear 12 to the top link 50, said bar 10 and hitch bar 36 will seek to straighten, the bar 10 turning on its pivot 13. This puts a compression on the spring 51 and causes the control valve of the hydraulic system of the tractor to move to a neutral position. This action, automatically transmitted to the hydraulic control valve, changes the quantity of oil in the cylinder according to variation in the contour of the ground, and holds the tool 35 in its proper working condition. It will be noted that the connection between hitch bar 36 and the hitch at the bolt pin 19 is made at a relatively low point to keep the tool 35 firmly in position.

Should the operator, from a position on the tractor, desire to raise the tool discs as above explained, the finger trip control is moved to fill the cylinder 57 which forces the piston 56 outwardly to rock the bell crank lever 55. This lever, in turn pulls on the links 54 which raise the arms 52 on their pivots 53 and, consequently tilt the frame 20 upwardly on its pivot 13. This movement of the frame 20 will exert a pull on the chain 31 and, therefore, a pull on the operating lever 39 which moves the wheel operating, disc-lifting mechanism of the tool 35. This operation may be performed with the stud 28 in any of the pairs of holes 27 of the frame 20.

In addition to the above, automatic lifting of the machine discs may be had by arranging the chain as shown with the stud in one of the outer holes. Such lifting may be accomplished when the tractor is turning. The hook-up shown is for accomplishing this on a right turn. It may be seen that as the tractor turns, it will pivot at the pin 19 on the hitch bar 36, and the stud 28 will swing in an arc around said pivot to again cause a pull on the control lever 39.

The stop bar 10ª serves to limit the downward position of the tiltable plate 20 so that when the tool 35 is being pulled in a straight line, there is little relative movement between the hitch bar 36 and the chain 31. By suitably shifting the hitch bar 36 to a desired position along the length of the draw-bar 37 and moving the stud 28 to a desired set of holes 27, and by further selecting a desired hole 14 for the pin 15, any desired working arrangement may be made to obtain wanted results.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A hitch comprising a substantially upright member adapted to be pivotally connected at its upper end to the hydraulic control of a tractor, a universal connection at the lower end of said member adapted to receive the forward end of the hitch bar of an agricultural machine having a part to be adjusted, an element of substantial length connected at its forward end to an intermediate part of said upright member, the rearward portion of said element being of substantial width and having a plurality of spaced holes arranged along said width, power-operated lift drawbars connected at their rear ends to said rearward portion of the element and adapted to be connected at their forward ends to the rear end of a tractor, an elongated flexible member connected at its forward end to said universal connection and adapted to be connected at its rear end to said agricultural machine, and a pin selectively positioned in the mentioned holes to effectively deflect said elongated flexible member so as to vary the tensioning effect of the latter member as desired.

2. A hitch comprising a substantially upright member adapted to be pivotally connected at its upper end to the hydraulic control of a tractor, a universal connection at the lower end of said member adapted to receive the forward end of the hitch bar of an agricultural machine having a part to be adjusted, an element of substantial length connected at its forward end to an intermediate part of said upright member, the rearward portion of said element being of substantial width and having a plurality of spaced holes arranged along said width, power-operated lift drawbars connected at their rear ends to said rearward portion of the element and adapted to be connected at their forward ends to the rear end of a tractor, an elongated flexible member passing over said element and connected at its forward end to said universal connection and adapted to be connected at its rear end to said agricultural machine, and a stud selectively positioned in said holes, said elongated flexible member being trained around the stud and held deflected thereby so as to vary the tensioning effect of the latter member as desired.

3. A hitch comprising a substantially upright member having an upper forwardly directed end adapted to be pivotally connected to the hydraulic control of a tractor, an articulated hitch connection adjustably connected to the lower end of said member and adapted to receive the forward end of a hitch bar, a substantially triangular member of substantial length connected at its forward apex to an intermediate part of the upright member, power-operated lift drawbars connected at their rear ends to the rear end of said triangular member and adapted to be connected at their forward ends to opposite sides of the rear end of a tractor, an elongated flexible member passing over said triangular member and connected at its forward end to said articulated hitch connection and adapted to be connected at its rear end to an implement having a part to be adjusted, said triangular member having a plurality of holes selectively receiving a pin to effectively deflect said elongated flexible member so as to vary the tensioning effect of the latter as desired.

4. A hitch for connecting a tractor having an upper rearwardly directed hydraulic control and a lower pair of rearwardly directed power-operated lift drawbars to a farm implement having a forwardly directed hitch bar and adjustable soil-turning means, said hitch comprising a substantially upright member adapted to connect the mentioned hydraulic control and hitch bar, a rearwardly directed member of substantial length and width pivotally connected at its front end to an intermediate part of the upright member, the rearward portion of the rearwardly directed member being adapted to connect to the rearward ends of said lift drawbars, and an elongated flexible member connected at one end to the lower end of the upright member and adapted to be connected at the other end to the adjustable soil-turning means of the farm implement, said rearwardly directed member having a plurality of holes selectively receiving a pin to effectively deflect said elongated flexible member so as to vary the tensioning effect of said latter member as desired.

5. A hitch for connecting a tractor having an upper rearwardly directed hydraulic control and a lower pair of rearwardly directed power-operated lift drawbars to a farm implement having a forwardly directed hitch bar and adjustable soil-turning means, said hitch comprising a substantially upright member adapted to connect the mentioned hydraulic control and hitch bar, a substantially triangular plate of substantial length connected at its forward apex to an intermediate part of the upright member, said power-operated lift drawbars being adapted to be connected at their rearward ends to the rearward end of said triangular plate, and a chain connected at one end to the lower end of the upright member and adapted to be connected at the other end to the adjustable soil-turning means of the farm implement, said triangular plate having a plurality of holes selectively receiving a pin about which said chain is trained to effectively deflect the same so as to vary the tensioning effect thereof as desired.

CLARENCE E. NEWKIRK.

REFERENCES CITED

The following references are of record in the file of this patent:

UNITED STATES PATENTS

| Number | Name | Date |
| --- | --- | --- |
| Re. 20,967 | Rapp et al. | Jan. 3, 1939 |
| 1,505,201 | Johnson | Aug. 19, 1924 |
| 1,637,811 | Ferguson | Aug. 2, 1927 |
| 2,237,884 | Lysedahl | Apr. 8, 1941 |
| 2,247,534 | Von Schlegell | July 1, 1941 |
| 2,295,898 | Hollis | Sept. 15, 1942 |
| 2,297,788 | McGehee | Oct. 6, 1942 |
| 2,312,258 | Martin | Feb. 23, 1943 |
| 2,322,342 | Bunn | June 22, 1943 |
| 2,337,801 | Cook | Dec. 28, 1943 |
| 2,349,257 | Evans et al. | May 23, 1944 |
| 2,351,168 | Warne | June 13, 1944 |
| 2,413,807 | Warne | Jan. 7, 1947 |
| 2,414,114 | Martin | Jan. 14, 1947 |